(12) United States Patent
Arisaka et al.

(10) Patent No.: US 8,760,798 B2
(45) Date of Patent: Jun. 24, 2014

(54) STORAGE DEVICE

(75) Inventors: Toshihiro Arisaka, Odawara (JP);
Daisuke Matsuka, Yokohama (JP);
Hiroshi Fukuda, Odawara (JP);
Morihiro Waizumi, Minamiashigara
(JP); Kouichirou Kinoshita, Hadano
(JP); Naoki Wada, Odawara (JP)

(73) Assignee: Hitachi, Ltd., Tokyo (JP)

( * ) Notice: Subject to any disclaimer, the term of this patent is extended or adjusted under 35 U.S.C. 154(b) by 188 days.

(21) Appl. No.: 13/398,900

(22) Filed: Feb. 17, 2012

(65) Prior Publication Data

US 2013/0141817 A1 Jun. 6, 2013

(30) Foreign Application Priority Data

Dec. 1, 2011 (JP) .................................. 2011-263719

(51) Int. Cl.
*G11B 33/08* (2006.01)
(52) U.S. Cl.
USPC .................................................... 360/97.19
(58) Field of Classification Search
USPC .......... 360/97.19, 97.13, 97.14, 97.15, 99.12, 360/99.18
See application file for complete search history.

(56) References Cited

U.S. PATENT DOCUMENTS

| | | | |
|---|---|---|---|
| 7,289,285 B2 * | 10/2007 | Barnes ............................ | 360/59 |
| 7,375,911 B1 * | 5/2008 | Li et al. ........................... | 360/75 |
| 2005/0135057 A1 | 6/2005 | Mihara et al. | |
| 2007/0068756 A1 * | 3/2007 | Huston et al. ................. | 188/378 |
| 2009/0034117 A1 * | 2/2009 | Higashino ................... | 360/78.06 |
| 2009/0195922 A1 * | 8/2009 | Urmanov et al. .......... | 360/97.02 |
| 2009/0279198 A1 * | 11/2009 | Tanner ............................ | 360/71 |
| 2010/0020439 A1 * | 1/2010 | Watanabe ................... | 360/97.02 |
| 2012/0155011 A1 | 6/2012 | Arisaka et al. | |
| 2013/0157729 A1 * | 6/2013 | Tabe ............................. | 455/573 |

FOREIGN PATENT DOCUMENTS

JP  2005-182936 A  7/2005

* cited by examiner

*Primary Examiner* — Allen T Cao
(74) *Attorney, Agent, or Firm* — Mattingly & Malur, PC

(57) ABSTRACT

In a storage device provided with a plurality of recording devices, the vibrations which propagate to the recording devices through a board can be reduced with a small number of parts. A storage device equipped with a plurality of recording devices having: a canister equipped with the recording device; a board equipped with a circuit that transmits a signal to the recording device or processes a signal; a chassis equipped with the board and the canister; a plate-like piezoelectric element attached to part of the board; a vibration detection sensor attached to part of the board; and a control unit that controls a drive signal given to the piezoelectric element in accordance with a sensor output of the vibration detection sensor is proposed.

10 Claims, 9 Drawing Sheets

STORAGE DEVICE

BACKGROUND OF THE INVENTION

1. Field of the Invention

The present invention relates to a storage device.

2. Background Art

An example of a mounting method of a HDD (Hard Disk Drive) is shown in JP Patent Publication (Kokai) No. 2005-182936 A. In the "Abstract" section thereof, it is described that "A mounting device is composed of: a damping material fixing piece 40 for providing damping materials 44, 45, and 46 for a first HDD 10; a retaining frame 50 for retaining the first HDD 10 integrated with the damping material fixing piece 40 and fixing a control board 30; a damping material fixing piece 60 which provides damping materials 64 for a second HDD 20 and is disposed so as to get away from a palm rest part 83 upon mounting by cooperation with a step part 85 of a unit housing part 84; and a retaining box 70 retaining the second HDD 20, which is integrated with the damping material fixing piece 60, and is coupled to the retaining frame 50".

In a storage device equipped with a plurality of recording devices, the recording devices are attached to a chassis of the storage device by canisters. Hereinafter, the case in which the recording devices are HDDs will be explained. The HDD has a drive mechanism such as an actuator and a spindle of a disk therein, and the HDD per se generates vibrations when the drive mechanism works. The vibrations propagate also to the other HDDs, which are attached to the chassis of the storage device and not carrying out input/output of information signals, and vibrate them. Furthermore, when the vibrations of the HDDs which are not carrying out input/output of information signals are mutually overlapped and transmitted to the HDD, which is carrying out input/output of information signals, as external vibrations, the operation of the HDD, which is carrying out input/output of information signals, is affected, and the amount of information input/output per time is adversely affected.

These vibrations propagate also to the board, which transmits information signals, via the canisters of the HDDs or input/output connectors of the HDDs. In order to reduce the vibrations, in JP Patent Publication (Kokai) No. 2005-182936 A, the damping materials are disposed between the canister of the HDD and the HDD to suppress transmission of the vibrations. However, in this method, the damping materials have to be sandwiched in all of the parts between the canister of the HDD and the HDD. Therefore, many damping materials have to be used, and the number of parts is significantly increased as a whole device.

SUMMARY OF THE INVENTION

The present inventor diligently studied the above described problems and found out techniques for reducing the propagation of vibrations between recording devices with a small number of parts in a storage device having the recording devices.

In order to solve the above described problems, for example, the configurations according to claims are employed. The present specification includes a plurality of means that solve the above described problems, and one example of the means is a storage device equipped with a plurality of recording devices having a configuration including: a canister equipped with the recording device; a board equipped with a circuit that transmits a signal to the recording device or processes a signal; a chassis equipped with the board and the canister; a plate-like piezoelectric element attached to part of the board; a vibration detection sensor attached to part of the board; and a control unit that controls a drive signal given to the piezoelectric element in accordance with a sensor output of the vibration detection sensor.

Another example of the means which solve the above described problems is a storage device equipped with a plurality of recording devices having a configuration including: a canister equipped with the recording device; a board equipped with a circuit that transmits a signal to the recording device or processes a signal; a chassis equipped with the board and the canister; a laminated piezoelectric element having a first end attached to part of the board; a weight attached to a second end of the laminated piezoelectric element; a vibration detection sensor attached to part of the board; and a control unit that controls a drive signal given to the laminated piezoelectric element in accordance with an output of the vibration detection sensor.

According to the present invention, in a storage device having a plurality of recording devices, the vibrations from the recording devices can be reduced with a small number of parts. The problems, configurations, and effects other than those described above will be elucidated by the explanation of embodiments below.

DETAILED DESCRIPTION OF THE PREFERRED EMBODIMENTS

Hereinafter, embodiments of the present invention will be explained based on drawings. The embodiments of the present invention are not limited to later-described exemplary modes, and various modifications can be made within the technical ideas thereof. In all of the drawings explaining the embodiments, the members having the same functions are denoted by the same or relevant symbols, and repeated explanation thereof will be omitted. Moreover, in the below embodiments, unless otherwise particularly required, the explanation of the same or similar parts will not be basically repeated.

The below embodiments will be explained on the assumption that a storage device is a RAID device, and a recording device is a HDD.

First Embodiment

Figure 1:
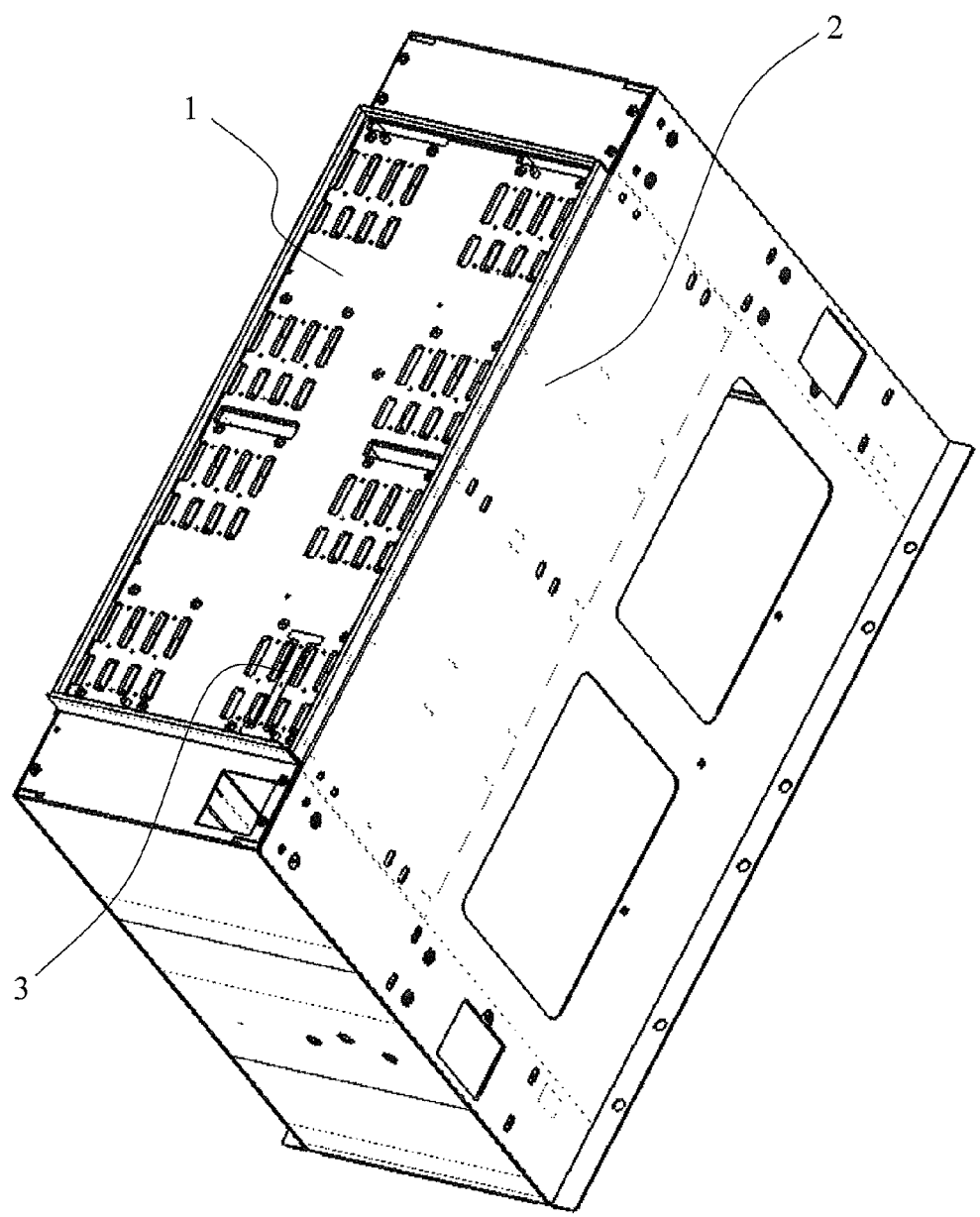
FIG. 1 is a back-side perspective view of a RAID device.

As an example of the appearance of a RAID device according to the present embodiment, FIG. 1 shows the back-side structure thereof. As described later, a board 1 to which a plurality of HDDs are attached is attached so as to cover an opening provided in the back side of a chassis 2. The board 1 is like a flat plate, and circuits which transmit signals to the HDDs and/or circuits which process signals are mounted thereon. An element which changes its volume by application of a voltage, i.e., a plate-like piezoelectric element 3 is pasted onto part of the board 1. In the case of FIG. 1, the plate-like piezoelectric element 3 is pasted onto a lower right corner of the board 1. In the present embodiment, the plate-like piezoelectric element 3 is used as a device which actively reduces the vibrations of the board 1.

Figure 2:
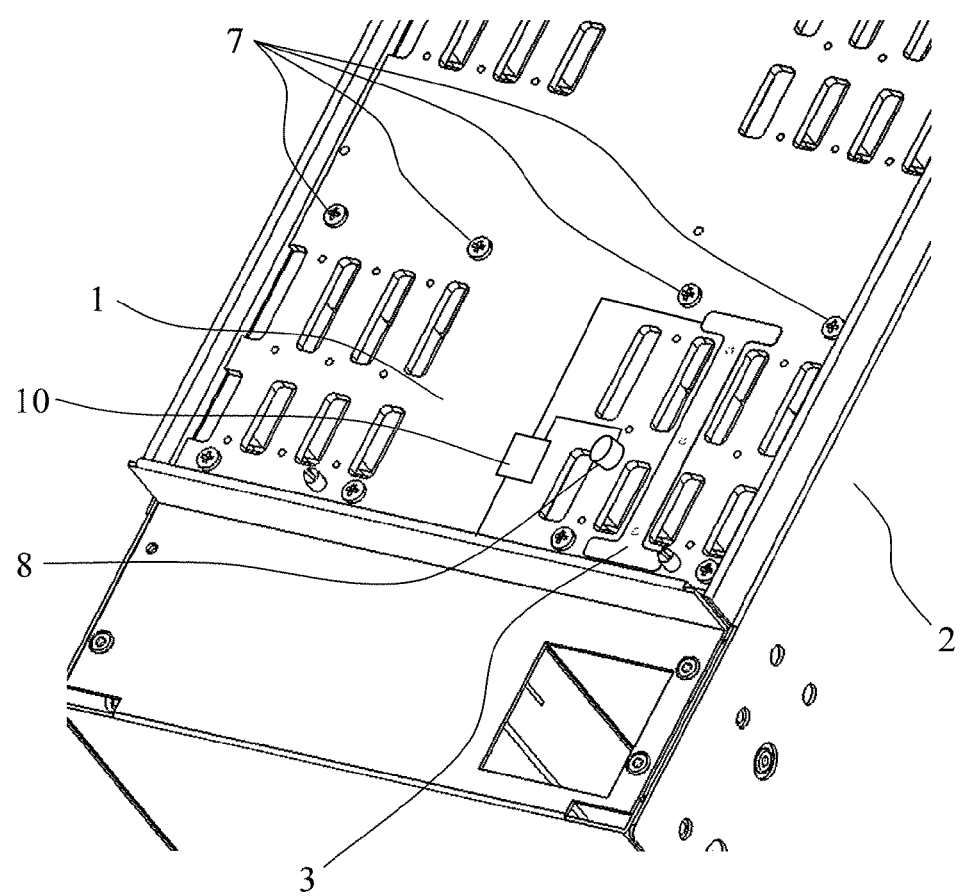
FIG. 2 is an enlarged perspective view of part of a back-side structure.

FIG. 2 shows an enlarged drawing of the vicinity of the attachment part of the plate-like piezoelectric element 3 in the back-side structure shown in FIG. 1. The board 1 is attached to an unshown beam-like part, which is formed on the inner side of the chassis 2, with screws 7. In FIG. 2, only part of the screws are shown with symbols. Needless to say, also in the region not shown in FIG. 2, the board 1 is attached to a corresponding beam-like part with unshown screws 7.

The plate-like piezoelectric element 3 is a long and thin plate-like member, and the longitudinal direction thereof is disposed in parallel with the longitudinal direction of the board 1. In the present embodiment, this direction also matches the longitudinal direction of the HDDs. As shown in FIG. 2, in the board 1 according to the present embodiment, an acceleration detection sensor 8 (hereinafter, referred to as "sensor") is disposed in the vicinity of the plate-like piezoelectric element 3. The sensor 8 is a device which detects the acceleration of the vibrations generated/propagated in the board 1.

Both of the plate-like piezoelectric element 3 and the sensor 8 are connected to a controller 10 attached to the board 1. The controller 10 controls drive of the plate-like piezoelectric element 3 based on the acceleration detected by the sensor 8 and actively reduces the vibrations of the board 1. The sensor 8 and the controller 10 are small members. Therefore, in FIG. 1, illustration thereof is omitted.

The electric power that drives the controller 10 is supplied from the board 1. Generally, the electric power necessary for the controller 10 is sufficiently small in comparison with the electric power consumption of the whole RAID device. The control of the controller 10 (details will be described later) is irrelevant to the input/output of information signals carried out by the RAID device. Therefore, the controller 10 can be provided completely separately from the circuit that controls input/output of information. Therefore, the controller 10 can be mounted on the board 1.

Figure 3:
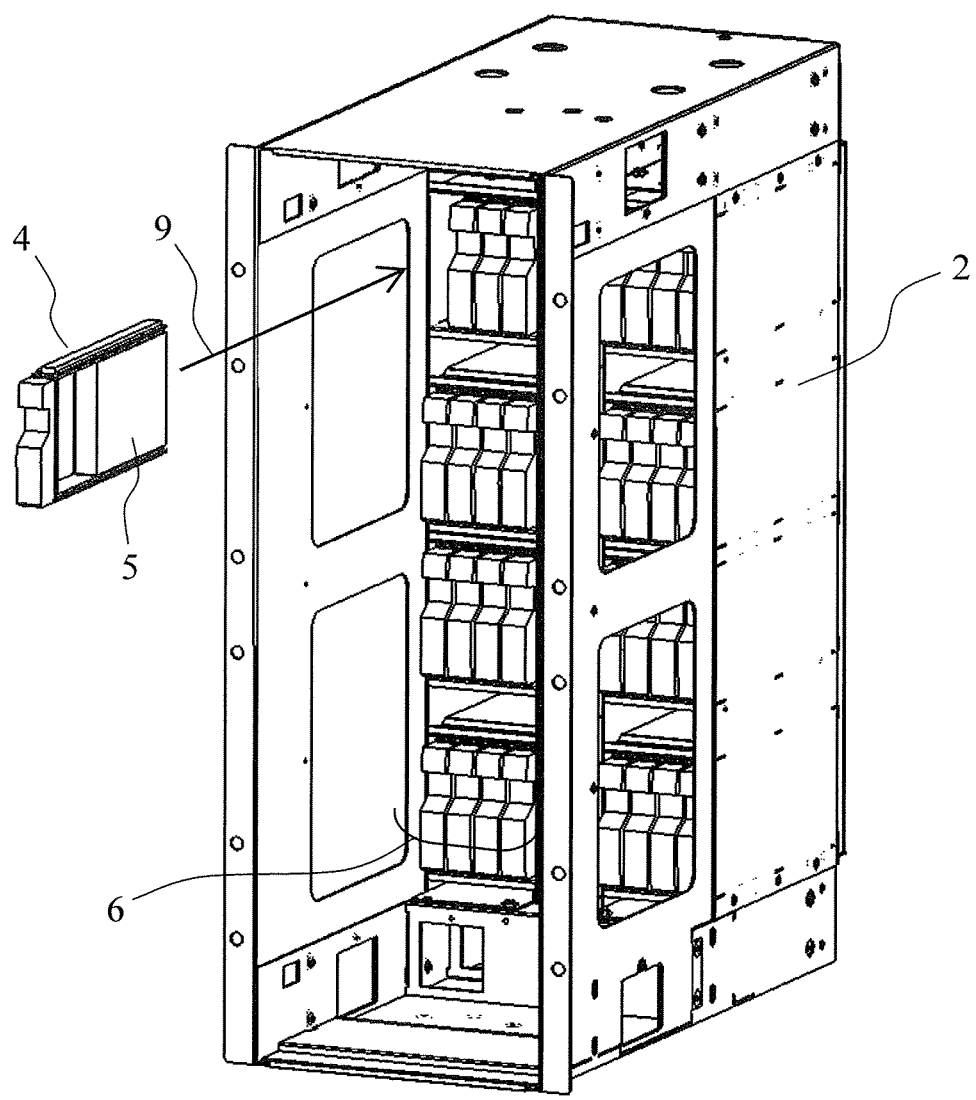
FIG. 3 is a front perspective view of the RAID device.

FIG. 3 shows a drawing of the RAID device viewed from a diagonal front side. The HDD 5 serving as a storage device is mounted in a canister 4 serving as a retaining member thereof. Therefore, the HDDs 5 are attached to the board 1 in the state in which the HDDs are retained by the canisters 4. Upon attachment, as shown in FIG. 3, the canisters 4 are inserted in the depth direction (shown by an arrow 9 in the drawing) of the chassis 2. Unshown connectors disposed in the back side of the HDDs 5 are engaged with corresponding connectors provided in the board 1 side so as to attach the HDDs 5 to the board 1. When the unshown connectors disposed on the back side of the HDDs 5 and the corresponding connectors in the board 1 side are mechanically and electrically coupled to each other, the HDDs 5 become an operable state. In other words, the state in which electric power can be supplied to the HDDs 5 from the board 1 via the connectors is achieved, and information signals can be input/output to/from the board 1 and the HDDs 5.

FIG. 3 shows the example of the RAID device in which eight groups 6, each of which includes four HDDs 5 as one unit, i.e., in total, 32 HDDs 5 can be mounted on the board 1. However, in the present invention, effects are not changed by the number of the groups 6 or the number of the HDDs 5 constituting the group 6. In the RAID device, the number of the groups 6 and the number of the HDDs 5 constituting the group 6 are changed depending on the size of the device; however, the HDDs 5 are often mounted separately in the groups 6 from the viewpoint of management and maintenance.

Figure 4:
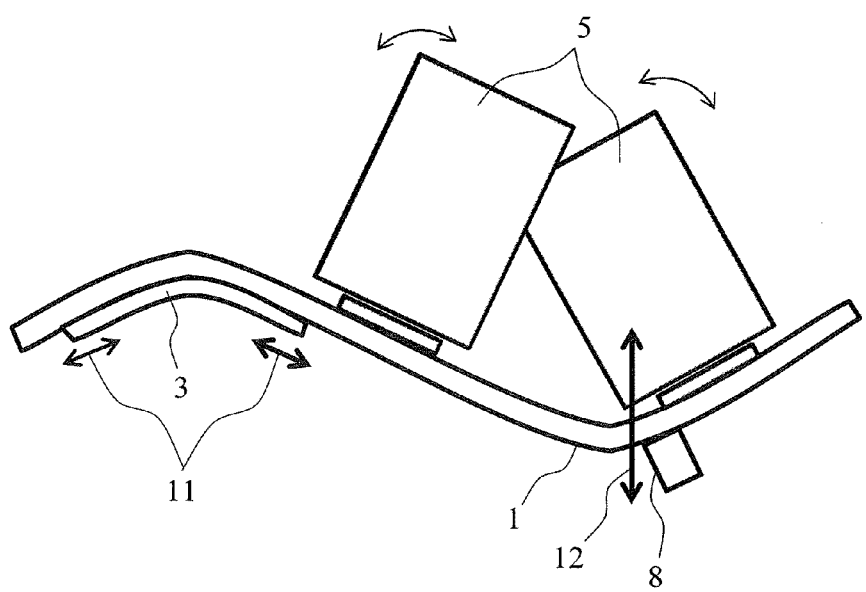
FIG. 4 is a drawing explaining a vibration suppression principle employed in a first embodiment.

FIG. 4 shows a vibration suppression principle using volume deformation of the plate-like piezoelectric element 3. In order to simplify the drawing, FIG. 4 shows only two of the HDDs 5, and the chassis 2, the canisters 4, etc. are omitted in the illustration. The HDDs 5 coupled to the board 1 have a relatively large mass. Therefore, as a whole, the state that the mass is mounted on a flat plate is obtained.

In the HDD 5, when an unshown magnetic head is to be positioned at a predetermined position on a magnetic disk, an actuator provided therein works to move the magnetic head. Vibrations are generated along with the working of the actuator, the vibrations rattle the whole HDD, and the vibrations accompanied by deformation of the board 1 are generated as a result.

Since the board 1 approximately has the shape of a flat plate, the vibrations that cause the board 1 to undergo bending deformation in the thickness direction thereof are generated. In FIG. 4, the direction 12 of the vibrations is shown by an arrow. In FIG. 4, the deformation of the board 1 caused by the vibrations is shown in an exaggerated manner. In the present embodiment, the acceleration of the vibrations are detected by the sensor 8, and the volume deformation of the plate-like piezoelectric element 3 is controlled so as to generate the force that reduces the vibrations (in a short summary, the force that generates the force opposite to the direction of the vibrations). Specifically, the controller 10 to which the sensor output is input causes the plate-like piezoelectric element 3 to deform in the long-side direction thereof (tensile direction 11), thereby causing the force that cancels out the vibrations of the board 1 to act on the board 1 and reducing the vibrations of the board 1. As shown in FIG. 4, the plate-like piezoelectric element 3 is deformed along the surface of the board 1.

The reduction of the vibrations of the board 1 according to the present embodiment leads to reduction of the external vibrations that propagate to the working HDDs 5, and the influence on the positioning work carried out by the unshown actuator incorporated in the HDDs 5 can be reduced. When input/output of the information signals can be executed without disturbing the positioning work in this manner, reduction of the input/output performance of the information signals in the RAID device can be improved.

Figure 5:
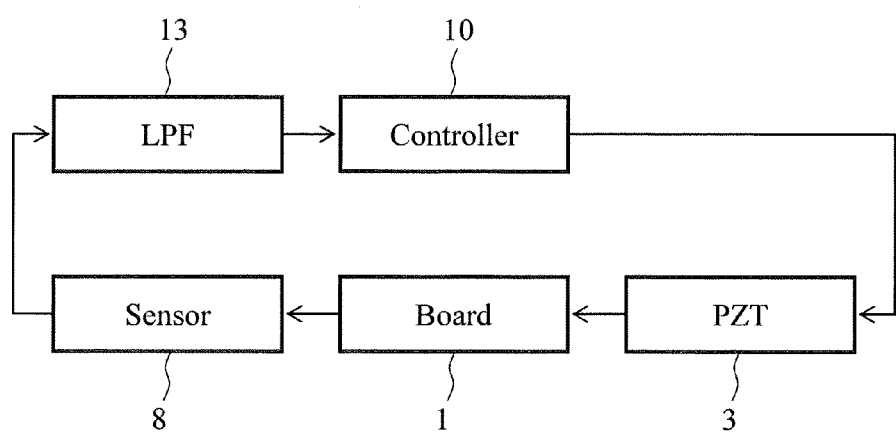
FIG. 5 is a diagram showing the flow of control signals employed in the first embodiment.

FIG. 5 shows the flow of control signals in the present embodiment. As shown in FIG. 5, the vibrations of the board 1 are detected as acceleration by the sensor 8. The information of the detected acceleration is given as a sensor output from the sensor 8 to a low-pass filter (LPF) 13. The sensor output is given to the low-pass filter 13 in order to prevent impairment of the stability of a control system that is caused when the vibration component present in a frequency range higher than the vibration frequency range of the board 1 of interest is input to the controller 10. A detection signal expressing the size and phase of the vibrations is output from the low-pass filter 13 to the controller 10. In accordance with the detection signal, the controller 10 transmits a feedback signal so that the volume deformation having the amplitude and phase that reduce the vibrations of the board 1 is generated in the plate-like piezoelectric element 3. Specifically, as explained with FIG. 4, the plate-like piezoelectric element 3 is stretched and deformed along the board surface to reduce the vibrations of the board 1.

Figure 6:
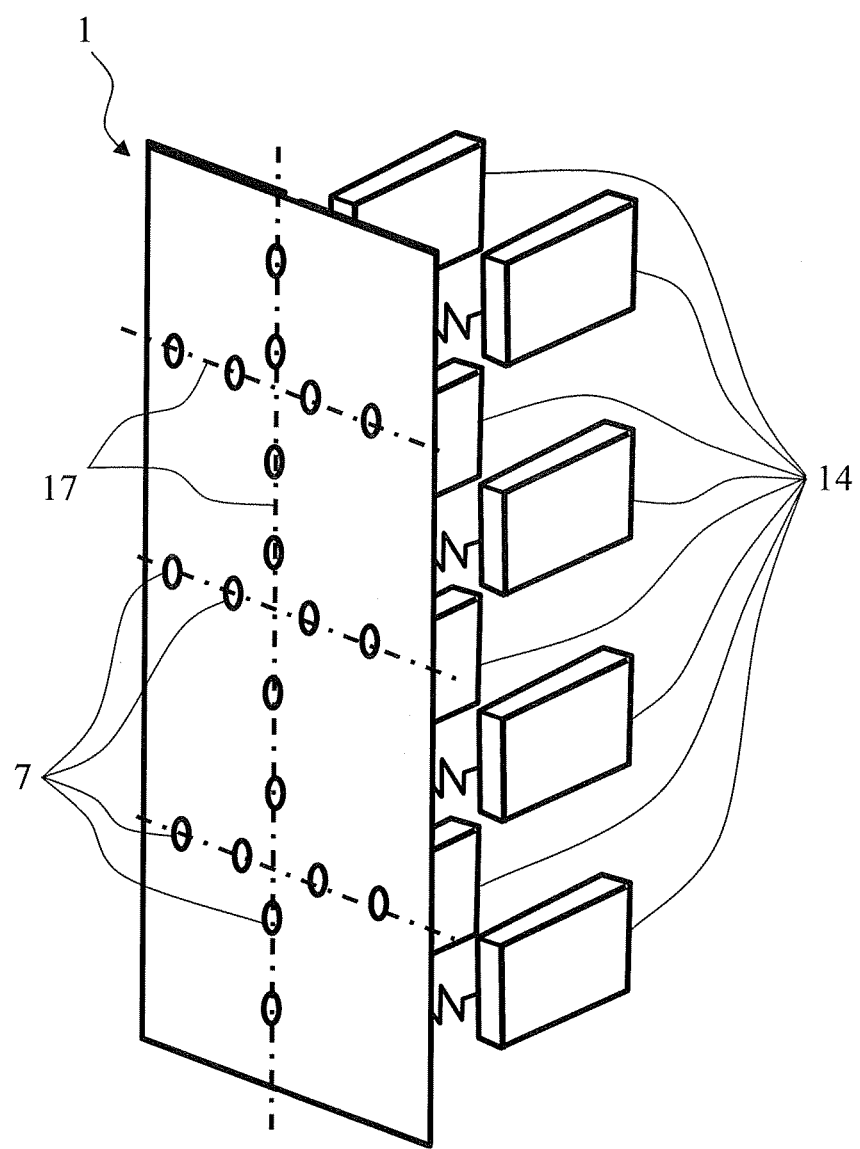
FIG. 6 is a model drawing of vibration elements of the first embodiment.

FIG. 6 shows a drawing in which main vibration elements in the RAID device according to the present embodiment are made into a model. The behavior of the RAID device according to the present embodiment can be considered as a model in which eight vibration systems 14 are disposed on the surface of the flat-plate-like board 1. The vibration system 14 is made into a model as a single-degree-of-freedom vibration system composed of the mass of the four HDDs 5 belonging to the single group 6 and the rigidity of the part coupling them to the board 1 via the connectors. In practice, the vibration system should be made into a model as a multiple-degree-of-freedom vibration system having at least four vibration modes since there are four HDDs 5. However, in this case, in order to simplify explanation, the vibration system is expressed as a model representatively with one degree of freedom.

As described above, the RAID device according to the present embodiment has the eight groups 6, and the eight vibration systems 14 are attached to the flat-plate-like board 1. The board 1 is attached to the chassis 2 with the screws 7, and the portions fastened by the screws 7 are under fixed conditions as the board 1 and correspond to "nodes" in terms of vibration shapes. The screws 7 are attached to the unshown beam-like members of the chassis 2, and the beam-like members are disposed to avoid the HDDs 5. Therefore, as shown in FIG. 6, the beam-like members are disposed on the lines that vertically and horizontally sections the board 1. In the present specification, these lines are referred to as border lines 17. In FIG. 6, note that not all of the screws 7 and the border lines 17 are denoted by symbols.

Figure 7:
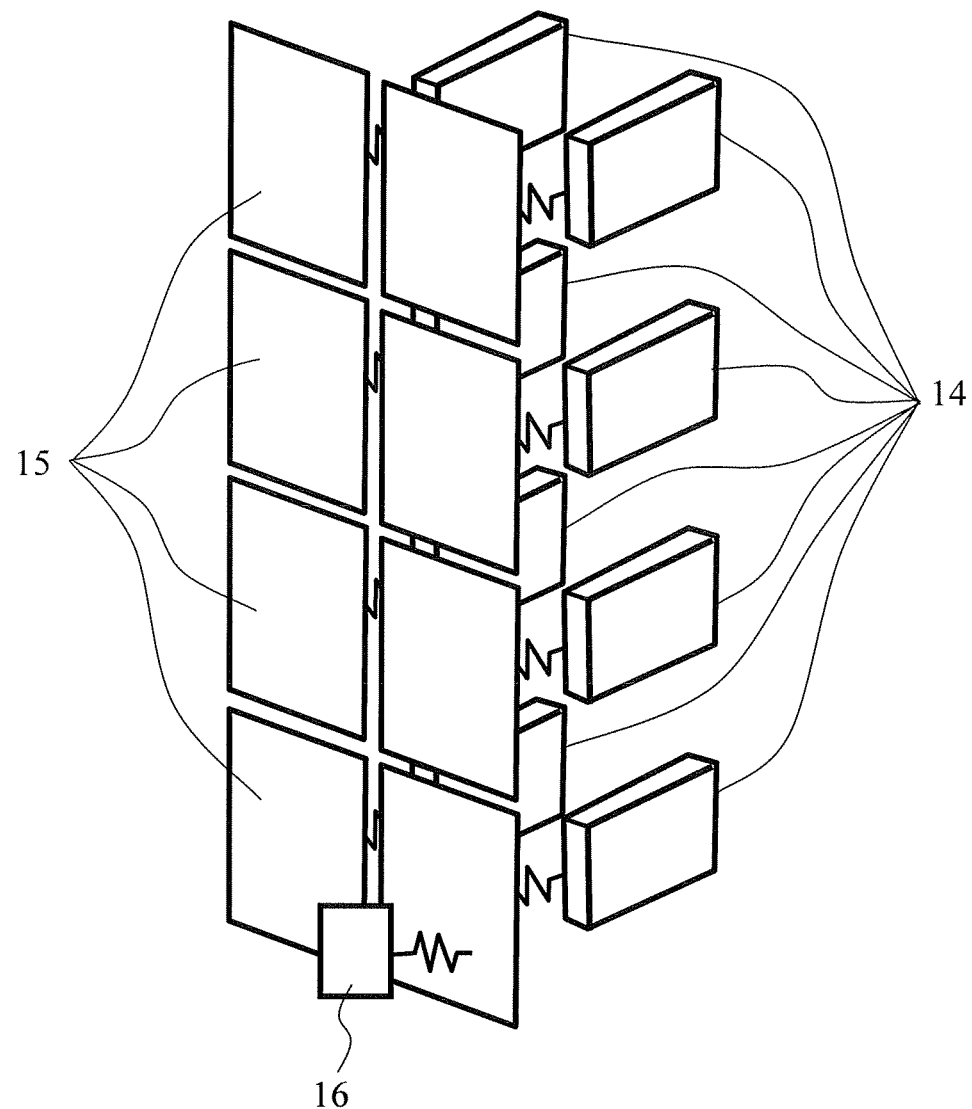
FIG. 7 is a model drawing of the vibration elements of the first embodiment.

The "nodes" are generated on the border lines 17 by the screws 7. Therefore, as shown in FIG. 7, the board 1 can be considered to be divided into eight small regions 15. Each vibration system 14 is joined with each region 15. Therefore, in the model, in total, eight pairs of the regions 15 and the vibration systems 14 are present. Each of these pairs is the vibration system having the same characteristics (mass and rigidity distribution) composed of the four HDDs 5. The vibration systems 14 having the same characteristics also have natural frequencies which have approximately the same value with each other.

In FIG. 7, the vibration system composed of the plate-like piezoelectric element 3 and the control system thereof is schematically expressed as a dynamic absorber 16. Even in the case of the vibration system that is electrically controlled, it is obvious for those skilled in the art that the vibration model thereof can be simplified as one-degree-of-freedom vibration system. As described above, the plate-like piezoelectric element 3 is disposed only at one location on the board 1. Therefore, in FIG. 7, the dynamic absorber 16 is provided in the region 15 in the lower right in the drawing among the eight regions 15.

Figure 8A:
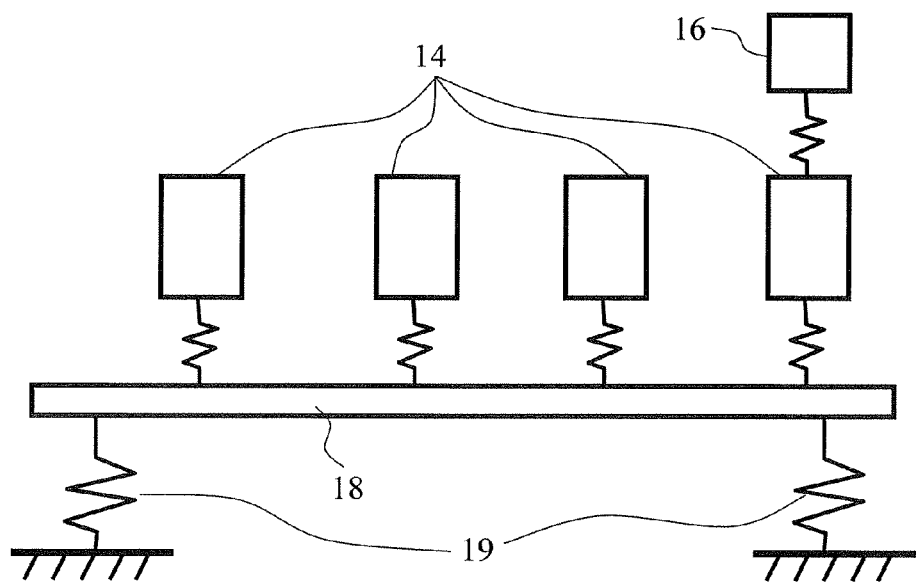
FIGS. 8A and 8B are working conceptual diagrams of the first embodiment.

FIG. 8A shows the relation between the vibration systems 14 and the dynamic absorber 16 in the present embodiment. In FIG. 8A, in order to simplify the drawing, only four of the vibration systems 14 are illustrated. As a matter of course, the below discussion is the same also in the case in which eight vibration systems 14 are provided.

As shown in FIG. 8A, it is widely known that, in the case in which the four vibration systems 14 having the same natural frequency are coupled to a same base 18, if one of the vibration systems 14 vibrates, the other vibration systems 14 are also resonated. This is a phenomenon generated when the vibration systems 14 have the same natural frequency and are mutually combined.

This means that the vibration amplitude of the other combined vibration systems 14 can be also reduced by exerting the attenuation effect on the vibrations of one of the vibration systems 14 by the dynamic absorber 16.

As shown in FIG. 7, the regions 15 formed by dividing the board 1 and the vibration systems 14 coupled thereto are independent vibration systems. Therefore, in order to realize reduction in the vibrations of all of the HDDs 5 in the device, a method of attaching the dynamic absorber 16 to each of the regions 15 (i.e., each vibration system 14) is conceivable. For example, when the HDD 5 is to be mounted on the canister 4, a viscoelastic member is attached thereto in an example of a conceivable method. However, in this method, viscoelastic members have to be attached to all of the canisters 4, and cost is inevitably increased by the corresponding amount.

On the other hand, in the case of the present embodiment, the number of the dynamic absorber 16 may be one (at least may be smaller than the number of the regions 15 or smaller than the number of the HDDs 5), and a vibration reducing effect can be obtained over all the regions by utilizing the resonance characteristic. As a matter of course, in consideration of improvement of the vibration reducing effect, the dynamic absorbers 16, i.e., the plate-like piezoelectric elements 3, the controllers 10, and the sensors 8 can be installed in the plurality of regions 15. In that case, the vibration reducing effect is improved, and, in addition, fine control corresponding to the working conditions of the device can be also carried out. The number of installation is determined depending on the balance between cost and the vibration reducing effect.

The base 18 in FIG. 8A is a virtual rigid body which supports the vibration systems 14. In consideration of the state in which the board 1 is supported by the chassis 2, this can be considered that the end of each of the regions 15 is supported by the chassis 2 (with the screws 7). However, the portions fastened by the chassis 2 and the screws 7 are not completely rigid bodies in practice, but have flexibility. Therefore, as shown in FIG. 8A, it can be considered that the base 18 is supported on an immobile body with virtual support springs 19. Thus, in the present embodiment, it can be considered that the board 1 is divided into the regions 15 divided by the screws 7, at the same time, the regions are mutually coupled, and the regions are the same vibration system. Therefore, as described above, the vibration reducing effect can be obtained for all of the HDDs 5 present on the board 1 by utilizing the resonance characteristic.

Figure 8B:
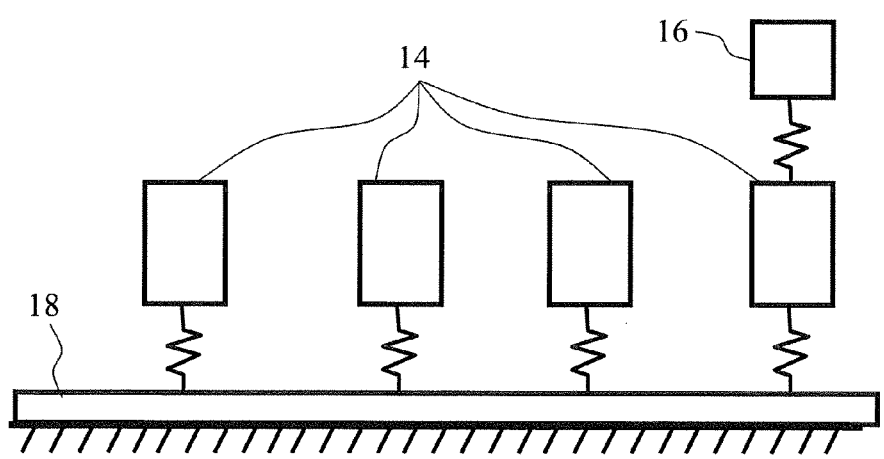

For reference, FIG. 8B shows in a simulated manner the case in which the virtual support springs 19 are not present. In this case, the base 18 can be considered to be a rigid body which is completely fixed to the immobile body and has infinite rigidity. This is practically equivalent to the state in which each of the individual vibration systems 14 is independently fixed to the chassis 2. Therefore, in the case of FIG. 8B, the resonance phenomenon among the vibration systems 14 does not occur, and the vibration reducing effect of the present embodiment cannot be expected.

In practice, the case in which the chassis 2 cannot be formed to have a complete symmetric shape and the case in which the sizes of the plurality of regions 15 cannot be formed to be the completely same size are conceivable. Even in those cases, basically, the mass of the HDDs 5 and the rigidity of the connectors, etc. supporting them have larger influence on the characteristics of the vibration systems 14 than the rigidity of the regions 15, which is part of the board 1. Therefore, even in the cases in which ideal shapes are not formed, large influence is not exerted on the effect of the present embodiment.

The RAID device is often used by mounting all the four HDDs 5 to each of the groups 6. However, a usage mode in which not all of the four HDDs 5 are mounted to a certain group 6 is also conceivable. In that case, the vibration reducing effect of the group 6 of which number of the mounted HDDs 5 is smaller than that of the other groups 6 can be reduced. The reason therefor is that only the vibration system 14 corresponding to that group 6 has the vibration characteristics such as the natural frequency which are different from those of the vibration systems 14 corresponding to the other groups 6. However, when the controller 10 is configured to be able to provide the control characteristics corresponding to the natural frequencies of the case in which the number of the HDDs 5 is small in accordance with needs, the vibration reducing effect can be improved also in the vibration systems having varied natural frequencies.

Instead of forming the dynamic absorber 16 with the plate-like piezoelectric element 3 and the control system like the first embodiment, a similar vibration reducing effect is considered to be able to be obtained also with a passive dynamic absorber composed of a widely used mass (weight) and an attenuation element such as a spring (collectively, rubber or the like is used in many cases). In other words, the vibration reducing effect can exert on the other vibration systems 14, which are in resonance relations like FIG. 8A.

However, the vibration reducing effect by the dynamic absorber depends on the ability of the attenuation element. Therefore, generally, only a limited effect is exerted. For example, the vibration reducing effect is considered to be low at the vibration systems 14, etc. at the positions physically away from the region in which the dynamic absorber 16 is attached.

On the other hand, in the dynamic absorber 16 according to the present embodiment composed of the plate-like piezoelectric element 3 and the control system thereof, setting and adjustment of the attenuation effect are comparatively free, and the characteristics of the control system can be adjusted so that a sufficient vibration reducing effect can be obtained also for the vibration systems 14 at a distance. In other words, the vibration reducing effect can be provided with respect to all of the HDDs 5 mounted on the RAID device.

The plate-like piezoelectric element 3 used in the present embodiment can utilize a widely used element which is formed by forming titanate zirconate lead ceramic having an electrostrictive effect into a plate and forming terminals on both surfaces thereof or other positions thereof. In the case of the present embodiment, an acceleration detection sensor (acceleration meter) using a piezoelectric element is used as the sensor 8. However, the sensor 8 is only required to be able to detect the vibrations of the board 1. Therefore, it will be easily understood that a strain sensor, a speed sensor, and a sensor that uses an acceleration detection method not depending on the piezoelectric effect (in the present specification, these are collectively referred to as "vibration detection sensors") are also within the range of the present invention.

In consideration of its vibration mode, the plate-like piezoelectric element 3 is desired to be installed at a location where the displacement amount of the board 1 is maximum with respect to that of the point when it is still. For example, in a natural frequency mode, which is a vibration suppression object, if the element is installed at the part corresponding to the "belly" of the bending deformation of the board 1, a large tensile force can be efficiently generated with respect to the board 1 even with the same displacement amount, and the vibration reducing effect can be enhanced. The sensor 8 is similarly desired to be installed at a position where the acceleration amplitude is large so that the natural frequency mode, which is the vibration suppression object, can be well understood.

As described above, according to the RAID device employing the vibration absorbing mechanism according to the present embodiment, the vibrations that propagate to the HDDs 5 serving as recording devices can be effectively reduced by the vibration reducing mechanism installed at only part of the whole device. Moreover, the vibration absorbing mechanism according to the present embodiment has a small number of parts and can be easily attached compared with conventional methods; therefore, the vibrations of the recording devices can be effectively reduced with low cost compared with the conventional methods.

Second Embodiment

Subsequently, a RAID device according to a second embodiment will be explained. The appearance and device configuration of the RAID device according to the present embodiment are the same as those of the first embodiment. Specifically, in total, 32 HDDs 5 are separated into eight groups and mounted on the board 1.

Figure 9:
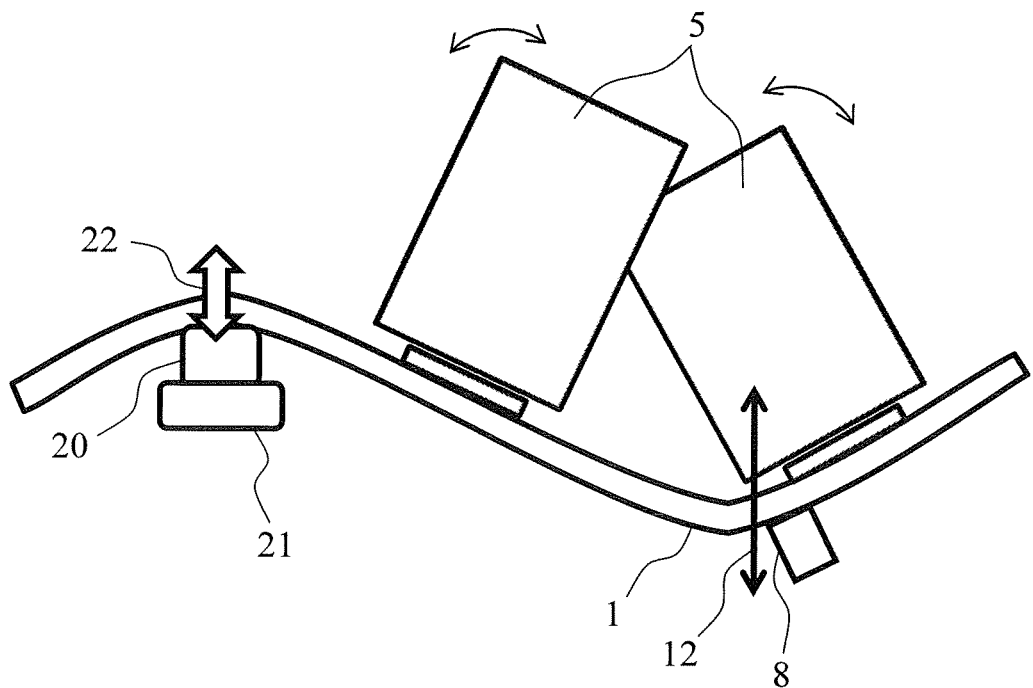
FIG. 9 is a drawing explaining a vibration suppression principle employed in a second embodiment.

Hereinafter, a vibration suppression principle according to a vibration absorbing mechanism employed in the present embodiment will be explained. FIG. 9 shows the idea of the vibration suppression principle employed in the present embodiment. Also in FIG. 9, in order to simplify the drawing, only two of the HDDs 5 are illustrated, and the chassis 2, the canisters 4, etc. are omitted. The difference between FIG. 9 and FIG. 4 is that a laminated piezoelectric element 20 and a weight 21 attached to a distal end thereof are attached to the board 1 instead of the plate-like piezoelectric element 3. The laminated piezoelectric element 20 is an element including many independent piezoelectric elements stacked and formed into a rod. In the case of the present embodiment, one end of the laminated piezoelectric element 20 formed into a rod is fixed to the board 1, and the other end is fixed to the weight 21. Therefore, the laminated piezoelectric element 20 undergoes volume deformation in the direction perpendicular to the board 1.

The flow of the control of the laminated piezoelectric element 20 is similar to the case of FIG. 5. Specifically, the vibrations of the board 1 are detected as acceleration by the sensor 8, and the sensor output is given to the controller 10 via the LPF 13. Based on the sensor output, the controller 10 generates a feedback signal, which causes deformation having the amplitude and phase which reduce the vibrations of the board 1 to be generated in the laminated piezoelectric element 20, and gives the signal to the laminated piezoelectric element 20. The feedback control causes the laminated piezoelectric element 20 to stretch in the direction parallel to the vibrating direction 12 (in the drawing, shown by a solid arrow) of the board 1. Along with the stretching deformation of the laminated piezoelectric element 20, the weight 21 is also moved. The movement of the weight 21 causes inertial force 22 (in the drawing, the working direction thereof is shown by a white arrow) serving as reaction force to act on the board 1. The inertial force 22 works in the direction that cancels out the vibrations of the board 1, thereby reducing the vibrations of the board 1.

In the first embodiment, the vibrations are reduced by using the tensile force of the plate-like piezoelectric element 3. On the other hand, in the present embodiment, the vibrations are reduced by using the inertial force 22 which is generated when the weight 21 is moved.

As well as the case of the first embodiment, the laminated piezoelectric element 20 increases the generated force by laminating ceramic materials. The heavier the weight 21, the larger the inertial force 22; however, the upper limit thereof is naturally limited in accordance with the force that can be generated by the laminated piezoelectric element 20. As a matter of course, to reduce the vibrations of the board 1, the size of the weight 21 is not increased so much as a whole, and the area required upon attachment to the board 1 is relatively small compared with the first embodiment.

As described above, when the vibration absorbing mechanism according to the second embodiment is used, a smaller vibration reducing mechanism that requires smaller installation space can be realized.

Third Embodiment

A RAID device according to the present embodiment will be explained with FIG. 10. The RAID device according to the present embodiment will be explained as a device provided with the vibration absorbing mechanism employed in the first embodiment. In the first embodiment, it has been explained that the vibration reducing effect is caused to act also on the vibration systems 14 positioned in the regions 15 away from the plate-like piezoelectric element 3 by actively utilizing the resonance phenomenon. Therefore, in the first embodiment, the sensor 8 is disposed in the vicinity of the plate-like piezoelectric element 3.

On the other hand, in the present embodiment, the case in which the installation positions of the plate-like piezoelectric element 3 and the sensor 8 are away from each other will be explained. In other words, the case in which the plate-like piezoelectric element 3 and the sensor 8 are disposed in at least mutually different regions 15 will be explained.

Figure 10:
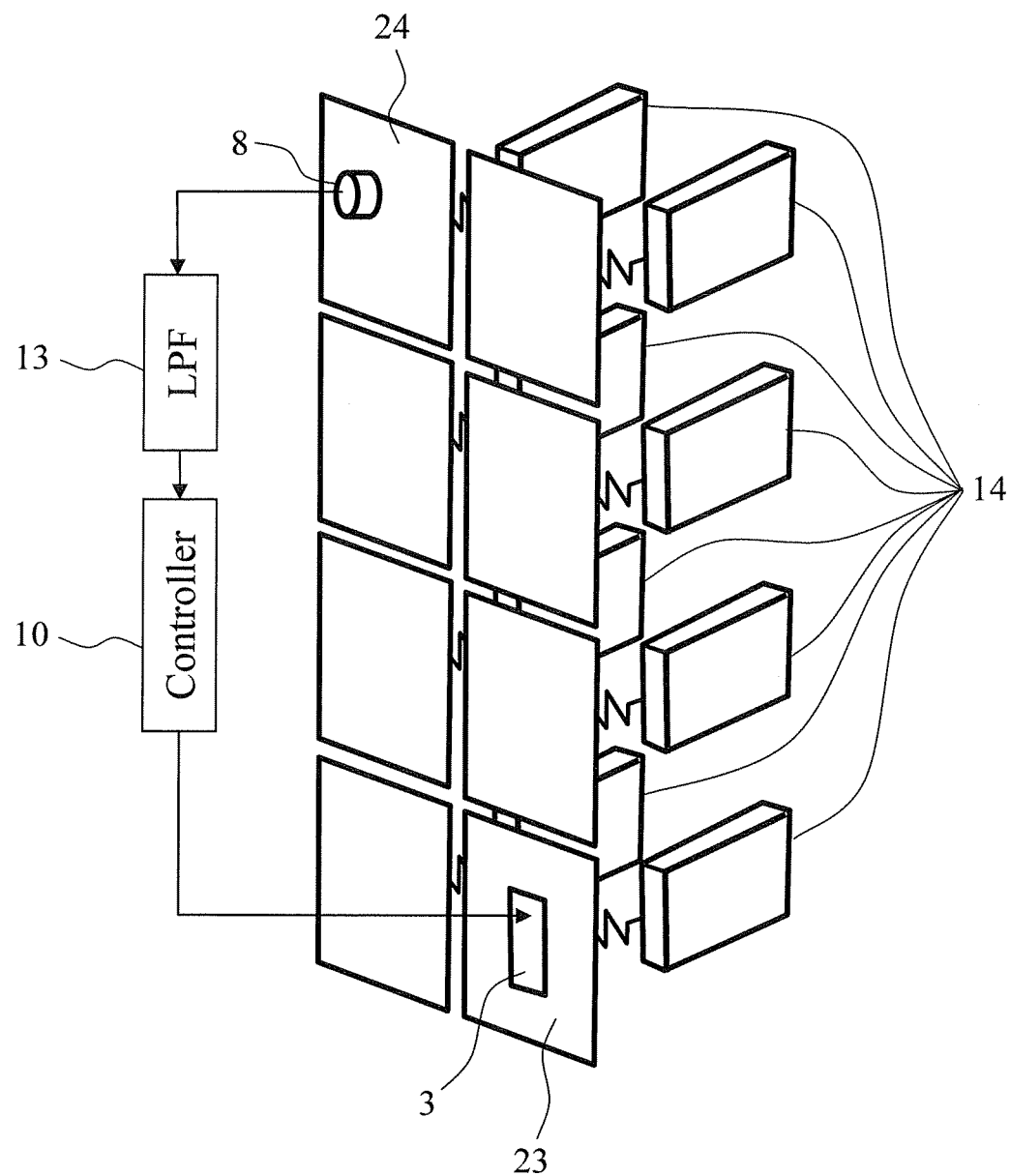
FIG. 10 is a drawing showing the flow of control signals employed in a third embodiment.

In FIG. 10, the plate-like piezoelectric element 3 is disposed in the region 15 of the right lower corner (in FIG. 10, particularly referred to as "region 23") among the, in total, eight regions 15 composed of four rows and two columns, and the sensor 8 is disposed in the region 15 of the left upper corner (in FIG. 10, particularly referred to as "region 24"). In other words, the plate-like piezoelectric element 3 and the sensor 8 are disposed at the diagonal positions of the board 1, and the control system feeds back the sensor output of the sensor 8 to the plate-like piezoelectric element 3 via the low-pass filter 13 and the controller 10. In this manner, in the present embodiment, the sensor 8 is disposed at the position away from the plate-like piezoelectric element 3, and the vibration reducing effect away from the plate-like piezoelectric element 3 is fed back to the plate-like piezoelectric element 3

FIG. 10 shows the configuration in which the sensor 8 is provided in the region 24 that is at the farthest position from the region 23 on the board 1. However, the sensor 8 may be provided in another region. The attachment position of the sensor 8 may be optimized by measuring the vibration characteristics of the board 1 in advance or executing a simulation such as finite element analysis. As a matter of course, since all of the HDDs 5 are mutually combined in any case, the amplitude reducing effect can be caused to act on all of the HDDs 5 as well as the other embodiments. Therefore, strict analysis is not required.

In the present embodiment, the case in which the plate-like piezoelectric element 3 is used has been explained. However, the explanation according to the present embodiment can be similarly applied also to the case in which the vibration absorbing mechanism composed of the combination of the laminated piezoelectric element 20 and the weight 21 using the inertial force is provided like the case of the second embodiment.

As described above, according to the present third embodiment, the vibrations can be reduced in all of the regions that constitute the board 1.

Other Embodiment Examples

The present invention is not limited to the above described first to third embodiments, but includes various modification examples. For example, the first to third embodiments have been explained in detail in order to understandably explain the present invention, and the invention is not necessarily limited to those provided with all of the explained configurations. Part of the configurations of a certain one of the embodiments can be replaced with the configurations of the other embodiment(s), and the configurations of the other embodiment(s) can be added to a certain one of the embodiments. Part of the configurations of each of the embodiments can be subjected to addition, removal, and replacement of the other configurations.

DESCRIPTION OF SYMBOLS

1 BOARD
2 CHASSIS
3 PLATE-LIKE PIEZOELECTRIC ELEMENT
4 CANISTER
5 HDD
6 GROUP
7 SCREW
8 SENSOR
10 CONTROLLER
11 TENSILE DIRECTION
12 VIBRATING DIRECTION
13 LPF
14 VIBRATION SYSTEM
15 REGION
16 DYNAMIC ABSORBER
17 BORDER LINE
18 BASE
19 SUPPORT SPRING
20 LAMINATED PIEZOELECTRIC ELEMENT
21 WEIGHT
22 INERTIAL FORCE

What is claimed is:

1. A storage device equipped with a plurality of recording devices, comprising:
    a canister equipped with the recording device;
    a board equipped with a circuit that transmits a signal to the recording device or processes a signal;
    a chassis equipped with the board and the canister;
    a plate-like piezoelectric element attached to part of the board;
    a vibration detection sensor attached to part of the board; and
    a control unit that controls a drive signal given to the piezoelectric element in accordance with a sensor output of the vibration detection sensor.

2. The storage device according to claim 1, wherein
    when the board is divided into A regions while using a location attached to the chassis as a boundary, A>B is satisfied, wherein the number of the plate-like piezoelectric element is B.

3. The storage device according to claim 1, wherein
    C>B is satisfied, wherein the number of the plate-like piezoelectric element is B, and the number of the recording devices is C.

4. The storage device according to claim 1, wherein
    the plate-like piezoelectric element is disposed at a part serving as a belly of bending deformation of the board.

5. The storage device according to claim 1, wherein
when the board is divided into a plurality of regions while using a location attached to the chassis as a boundary, the plate-like piezoelectric element is disposed in the region different from the region in which the vibration detection sensor is disposed.

6. A storage device equipped with a plurality of recording devices, comprising:
- a canister equipped with the recording device;
- a board equipped with a circuit that transmits a signal to the recording device or processes a signal;
- a chassis equipped with the board and the canister;
- a laminated piezoelectric element having a first end attached to part of the board;
- a weight attached to a second end of the laminated piezoelectric element;
- a vibration detection sensor attached to part of the board; and
- a control unit that controls a drive signal given to the piezoelectric element in accordance with a sensor output of the vibration detection sensor.

7. The storage device according to claim 6, wherein
when the board is divided into A regions while using a location joined with the chassis as a boundary, A>B is satisfied, wherein the number of the laminated piezoelectric element is B.

8. The storage device according to claim 6, wherein
C>B is satisfied, wherein the number of the laminated piezoelectric element is B, and the number of the recording devices is C.

9. The storage device according to claim 6, wherein
the laminated piezoelectric element is disposed at a part serving as a belly of bending deformation of the board.

10. The storage device according to claim 7, wherein
when the board is divided into a plurality of regions while using a location attached to the chassis as a boundary, the laminated piezoelectric element is disposed in the region different from the region in which the vibration detection sensor is disposed.

* * * * *